United States Patent [19]

Solomon

[11] 4,121,105

[45] Oct. 17, 1978

[54] IONIZATION DETECTOR

[75] Inventor: Elias E. Solomon, Duxbury, Mass.

[73] Assignee: The Gamewell Corporation, Medway, Mass.

[21] Appl. No.: 739,455

[22] Filed: Nov. 8, 1976

Related U.S. Application Data

[63] Continuation-in-part of Ser. No. 593,704, Jul. 7, 1975, Pat. No. 4,021,671.

[51] Int. Cl.[2] .......... G01T 1/18

[52] U.S. Cl. .......... 250/381

[58] Field of Search .......... 250/381, 385, 389; 340/237 S

[56] References Cited

U.S. PATENT DOCUMENTS

| | | | |
|---|---|---|---|
| 3,514,603 | 5/1970 | Klein | 250/381 X |
| 3,681,603 | 8/1972 | Scheidweiler et al. | 250/381 |
| 3,728,706 | 4/1973 | Tipton et al. | 250/381 X |
| 4,021,671 | 5/1977 | Solomon | 250/381 |

*Primary Examiner*—Davis L. Willis
*Attorney, Agent, or Firm*—Wolf, Greenfield & Sacks

[57] ABSTRACT

An ionization detecting fire alarm device that comprises a double chamber structure, a source disposed in at least one of the chambers and a vernier adjusting screw electrode protruding into one chamber. The chamber containing the adjustable electrode is more open to the atmosphere than the other chamber. Porting is provided between chambers and detection occurs by sensing the rate of change of ionization current in the chamber structure. The source or sources, one being in each chamber, is a beta source such as a nickel 63 source. A change in ionization current is detected by a unique circuit of this invention which comprises a programmable unijunction transistor oscillator circuit.

23 Claims, 9 Drawing Figures

IONIZATION DETECTOR

RELATED APPLICATION

This is a continuation-in-part application of application Ser. No. 593,704, filed July 7, 1975 now U.S. Pat. No. 4,021,671.

BACKGROUND OF THE INVENTION

The present invention relates, in general, to ionization detectors and is more particularly concerned with a device for detecting fires which preferably employs a beta source, although the teachings of this invention may also be applicable to use with other types of sources.

There are numerous different types of ionization fire alarm devices which are know. These detectors typically comprise one or two chambers and one or two radio-active sources. These devices operate on the basic principal of a change in the ionization current within the chamber upon detection of products of combustion and aerosols in the atmosphere where the detector is located.

Most of these detectors, including virtually all commercial detectors, employ an alpha source such as Americium 241. While these sensors have gained acceptance and are widely used in fire detection systems, it is well known that alpha particles are very much more hazardous than beta particles. It has been argued that normally the radiation is trapped within the ionization chamber and thus there is no problem. However, there are circumstances which have occurred wherein a detector using alpha particles has become hazardous. For example, situations have arisen after a fire where detectors have been lost in the rubble thus making disposal of the rubble a problem.

Accordingly, to make a safer device, it would be desirable to construct a detector using a low activity beta radiation source. Even some of the prior art patents such as U.S. Pat. Nos. 3,573,777; 3,271,756; 3,295,121; and 3,560,737 have mentioned the beta source as a possible radiation source for ionization detectors. However, generally speaking there is no detector currently available that uses a beta radiation source. There are many factors that may account for this lack of a use of the beta source. Generally, beta sources which have been considered were of the high activity type and thus were not suitable for constructing compact detectors. Other beta sources, such as Tritium, have a short half-life and present mechanical problems, such as migration. Therefore, these detectors were not suitable for use in ionization detection. In accordance with this invention preferably a low activity beta source is used such as nickel 63.

A further problem in the prior art with the use of beta sources is the extremely low ionization current that is available with these detectors. This usually results in difficulties with the associated electronic circuitry as well as producing problems regarding detection of extraneous noise signals. In accordance with this invention, the design of the chamber structure and the choice of the circuitry greatly reduce the problem of the low ionization current.

Still another problem associated with known ionization detectors is that, because the detectors may be used in different environments, it is difficult to produce a detector that will operate suitably in all of these environments without requiring adjustment in the field. In the past, many of these detectors were subject to humidity changes and air density changes which affected the sensitivity of the detector. Also, another problem with known detectors using radioactive sources is the tolerance of the source itself. While dimensions within the chamber can be held to a very close tolerance, radiation activity differs from source to source.

For example, U.S. Pat. Nos. 3,295,121 and 3,271,756 reveal a means for adjusting voltages at the ionization chamber output. However, these means rely on the alteration of the chamber geometry or the adjustmant of distance electrodes. This is a complex mechanical adjustment and will not give the degree of control as that provided by the adjustment means of the present invention. With the adjustable electrode of the present invention, detectors may be constructed with wide variations in sources from one detector to another.

Accordingly, it is one object of the present invention to provide a safe and reliable apparatus for detecting products of combustion and aerosols in a gas or typically the atmosphere.

A further object of the present invention is to provide a detector which is easy to produce and easy to adjust for optimum performance.

Another object of the present invention is to provide an improved ionization detector comprising a double chamber structure with one of the chambers being the basic sensing chamber with porting being provided between the chambers to compensate for slow ambient changes. The sensing chamber is preferably ported to both the secondary chamber and the atmosphere outside of the chamber structure.

Still a further object of the present invention is to provide a simple means of adjusting the voltages available from the ionization chamber. Actually, one adjustable electrode can be used in each chamber if it is a two chamber structure.

Another object of the present invention is to provide an ionization chamber structure that comprises baffles for directing the air to be sensed and that further comprises an electrostatic screen for the ionization chamber or chambers.

Still another object of the present invention is to provide a unique electronic circuit which will provide an inexpensive and reliable means for detecting the signal change which occurs in the ionization chamber.

A further object of the present invention is to provide a means for adjusting the decision level of the alarm circuit of this invention to allow for any desired sensitivity setting.

Still a further object of the present invention is to provide means associated with the circuitry for providing a visual indication of the condition of the ionization chamber structure.

Another object of the present invention is to provide a three chamber structure characterized by a built-in feedback path that regeneratively stabilizes the operating point of the device.

A further object of this invention is to provide a specially designed chamber construction inluding electrodes shaped that enhance the efficiency of the chamber and reduce ion recombination.

SUMMARY OF THE INVENTION

To accomplish the foregoing and other objects of this invention, the ionization detector generally comprises a chamber structure inluding means defining first and second chambers having respective first and second preferably plate-like electrodes and a common electrode separating the first and second chambers. Communication is provided between these chambers preferably by a porting arrangement and each of the chambers also has preferably a porting arrangement for communicating to the ambient atmosphere. One or both of the chambers may have a source preferably of beta particles contained therein. The detector also comprises an adjustable electrode contained in one of the chambers for adjusting the voltage between the fixed electrode of that chamber and the common electrode between the chambers. The electrode may be a conventional conductive electrode or could also be an insulator. The electrodes of the chamber structure are coupled to detection circuitry for detecting a change in the ionization current when a fire alarm condition exists.

In accordance with another aspect of the present invention, there is provided a unique detection circuit which comprises a relaxation oscillator circuit including a programmable unijunction transistor and light emitting diode. The circuitry also comprises a second programmable unijunction transistor circuit having delay means associated therewith for providing the basic alarm detection. The first oscillator circuit including that light emitting diode is primarily for detecting proper operation of the chamber structure.

In a preferred embodiment of the invention there is provided an ionization detector which comprises a three chamber structure which preferably comprises mesh means defining at least two of said chambers with a third partially open chamber defined by structure within one of said first two chambers. The mesh means, in addition to defining the chambers also defines, respectively, opposite main electrodes of the detector. In the preferred embodiment an adjustable electrode or particle capturing member supported from one of said mesh means and may be rotated in the chamber structure to finally adjust the ionization current to its optimum value. The structure in this preferred embodiment is also improved in that main electrodes although insulated from each other are directed towards each other so as to more closely follow the ion distribution within the chamber. It has been found that with the triple chamber the optimum operating point is provided while yet compensating for non-fire conditions.

BRIEF DESCRIPTION OF THE DRAWINGS

Numerous other objects, features and advantages of the invention will now become apparent upon a reading of the following detailed description taken in conjunction with the accompanying drawings, in which.

DETAILED DESCRIPTION

In one embodiment, the chamber structure of the present invention is constructed in two separate sections and is preferably provided having three separated fixed electrodes or plates. In addition to the fixed electrodes, one of the chambers also has extending thereinto an adjustable electrode or particle capturing member which may be in the form of a vernier adjusting screw or an adjusting plate.

Figure 1:
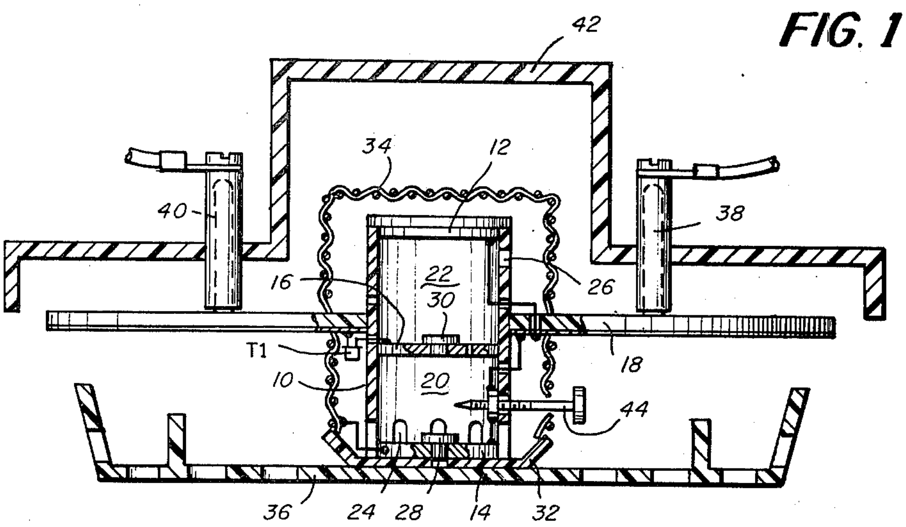
FIG. 1 is a cross-sectional view through one embodiment of the detector of this invention.

FIG. 1 shows one embodiment for the chamber structure which comprises an insulated cylinder 10, a top conductive plate 12, a bottom conductive plate 14, and an intermediate conductive plate 16. The cylinder 10 is suitably supported in a printed circuit board 18 having an opening therethrough of appropriate size to receive the cylinder 10. The printed circuit board 18 has terminals for receiving connections from the chamber structure. The plates and cylinder define a bottom chamber 20 and a top chamber 22. The cylinder at its bottom end has a plurality of slots 24 so that the chamber 20 is virtually open to the outside environment allowing for free movement of air through the chamber 20. The chamber 22, on the other hand, contains one or more orifices 26 which permits any slow changes in the outside environment to be communicated to chamber 22. Passages also exist in plate 16 so that any changes in the environment in chamber 20 are commutated to chamber 22. In this way slow variations are not detected by the chamber structure of this invention.

Preferably, there is one source 28 in chamber 20 and one source 30 in chamber 22. Alternatively, if only one source is used, preferably source 28, which is disposed in chamber 20, is used. Preferably, the source is used in the chamber that also contains the adjustable electrode.

The chamber structure may be suppored by an insulated base 32 having a mesh screen or shield 34 supported therefrom about the cylinder 10. This shielding prevents r.f. and static pickup. In the embodiment shown in FIG. 1, it is noted that the plate or electrode 14 is conductively coupled to the shield 34.

FIG. 1 also shows the baffle 36 which is suitably secured to support base 32. This baffle 36 directs the air stream and yet limits the air stream passing to the detector. The detector is supported by means of support posts 38 and 40 both of which may be hollow. These support posts support the printed circuit board 18 at opposite ends from a main support frame 42. The posts 38 and 40 may have wires running therethrough so that connections can be provided from the chamber structure to the circuitry discussed later in FIG. 6.

As previously mentioned, one problem with detectors that use radio-active sources is the tolerance of the source. While the dimensions within the chamber can be held to a very close tolerance, radiation activity differs characteristically from source to source. In accordance with this invention adjusting means are provided to enable the detectors to be constructed with a wide variation in the source that is employed. To achieve this an extra adjustable electrode 44 is employed. This electrode has a screw thread that is received by a threaded nut suitably supported in the wall defining the cylinder 10. The electrode may be electrically connected to any of the collector plates 12, 14 or 16 or may even be connected to a separate reference voltage. In the preferred embodiment, the electrode 44 is connected to either plate 12 or plate 14. In FIG. 1 it is noted that the electrode couples to plate 14 and is also shown being conductively tied to a point on the printed circuit board 18.

The electrode 44 extends into the ionization chamber 20 a predetermined distance. In this way the electrons are captured by this adjustable electrode and the voltage between the plates 14 and 16 is consequently increased. As previously mentioned the electrode can simply be an adjusting screw which is adjusted to protrude into the chamber the varying depths. The further that the electrode protrudes into the chamber the more electrons are captured and the voltage between the plates 14 and 16 is increased. With this adjustable electrode it is thus possible to vernieradjust the voltage level between the plates 14 and 16 to an optimum level which is preferably about one half the supply voltage.

Figure 2:
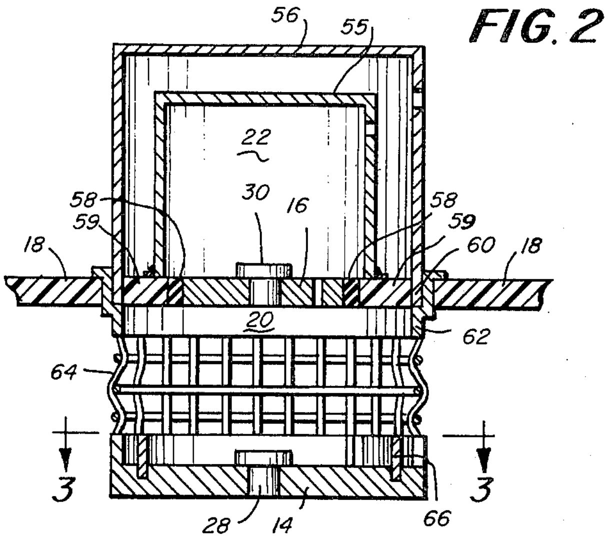
FIG. 2 is a cross-sectional view through a different embodiment of the detector.
Figure 3:
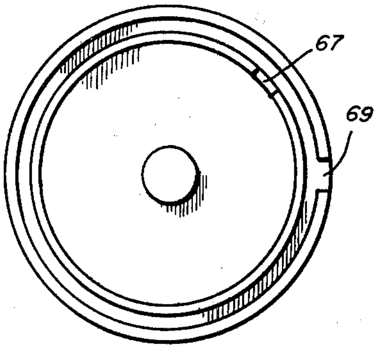
FIG. 3 is a cross-sectional view taken along line 3—3 of FIG. 2.
Figure 4:
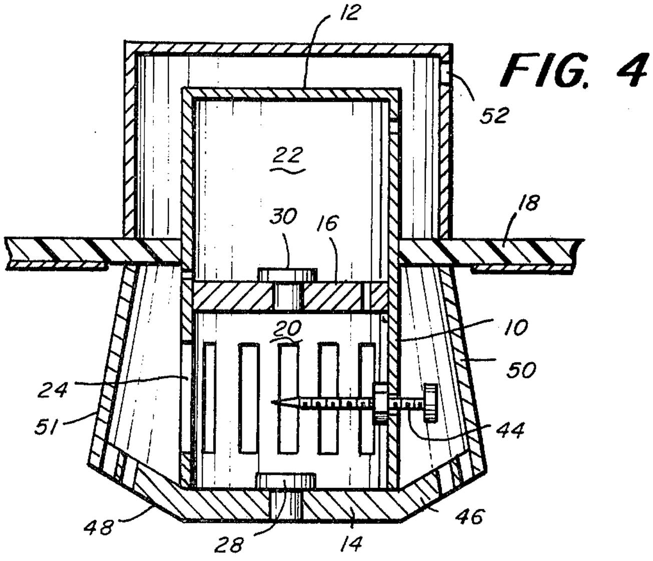
FIG. 4 is still a further cross-sectional view of a slightly different embodiment of the invention.

In FIGS. 2–6, reference characters are used like those shown in FIG. 1 to identify like parts. Thus, for example, FIG. 4 shows the printed circuit board 18, insulating cylinder 10, plates 12, 14 and 16, and chambers 20 and 22. Chamber 20 has a series of elongated slots 24. In this embodiment there are two sources 28 and 30 disposed respectively in chambers 20 and 22. The adjusting electrode 44 is like that shown in FIG. 1 and the basic chamber structure is also like the chamber structure shown in FIG. 1. However, in FIG. 4 the bottom plate 14 terminates in deflector ends 46 and 48 each having perforations therein. The structure shown in FIG. 4 and in the other drawings is basically of cylindrical shape as is the outer collar 50. The collar 50 also has one or more apertures 52 for causing an equilization in any slow changes between the outside environment and the environment inside of the collar 50. The deflector ends are essentially arranged concentrically around the chamber. The arrangement including the downwardly extending wall 51 of the collar 50 prevents direct horizontal or vertical air movement into the chamber 20.

FIGS. 2 and 3 show still another embodiment of the present invention. This embodiment is supported by the printed circuit board 18 and comprises base plate 14 and associated source 28; intermediate plate 16 and associated source 30 and caps 55 and 56. The plate 16 has at least one port passing therethrough for communication between the chambers 20 and 22. Insulating ring 58 separates the plate 16 from the printed circuit board section 59. A ring 62 extends below the board 18 and supports a wire mesh 64 between the ring 62 and the support base 14. An annular sliding ring 66 fits within the base 14 and has an aperture 67 which may be aligned with the aperture 69 (see FIG. 3) to permit access inside of the chamber 20 for cleaning or replacing the source 28 contained therein.

The cap 55 may be constructed of a solid metal or a metal mesh. The cap is secured to the section 59 of the printed circuit board by soldering. Cap 56 is preferably a metal mesh having three bottom tabs 60 fitting into holes in the printed circuit board 18. The ring 62 mates with the tabs 60, as shown, to electrically connect the cap 56 and ring 62 (also mesh 64). The top of ring 62 extending above board 18 is soldered to board 18.

In the embodiment shown in FIGS. 2 and 3 there is not disclosed any adjustable electrode. However, this electrode could simply be supported for insertion into the chamber 20 through the mesh 64.

Figure 5:
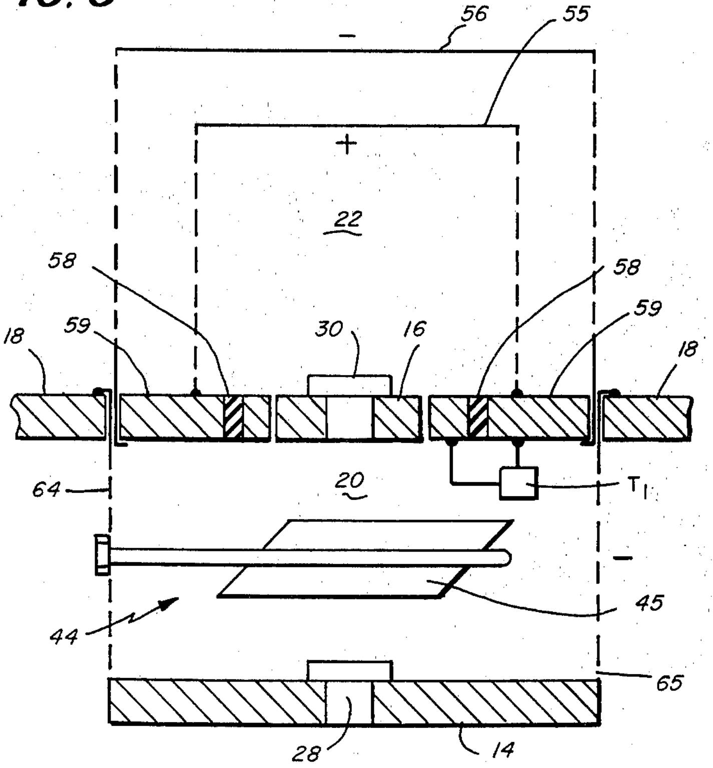
FIG. 5 is a somewhat schematic cross-sectional diagram of another embodiment employing a different adjustable electrode.

Referring now to FIG. 5, there is shown a partial cross-sectional and schematic diagram disclosing a structure quite similar to that shown in FIGS. 2 and 3. In this arrangement there is provided a lower mesh 64 that is open and provides quite free access into the chamber 20. Mesh 64 connects at its top and at a number of points to cap 56 as shown in FIG. 5. The board 18 has a like number of passages for receiving the tab of cap 56 and top end of mesh 64. The caps 55 and 56 are constructed of a mesh that is quite closed with quite small apertures, as schematically depicted in FIG. 5. A port 65 is provided above the plate 14 so that there is access to the source 28 for cleaning this source. The source 30 may be cleaned by removing the caps 55 and 56.

The embodiment of FIG. 5 differs from that shown in FIGS. 2 and 3 primarily because of the adjusting screw 44 which has a vane 45 disposed along its length. As the screw is rotated, the surface area presented to the ionization path varies thus altering the current within the chamber. With this structure, the adjusting screw can provide an adequate range of adjustment through one revolution of the screw or less.

Figure 6:
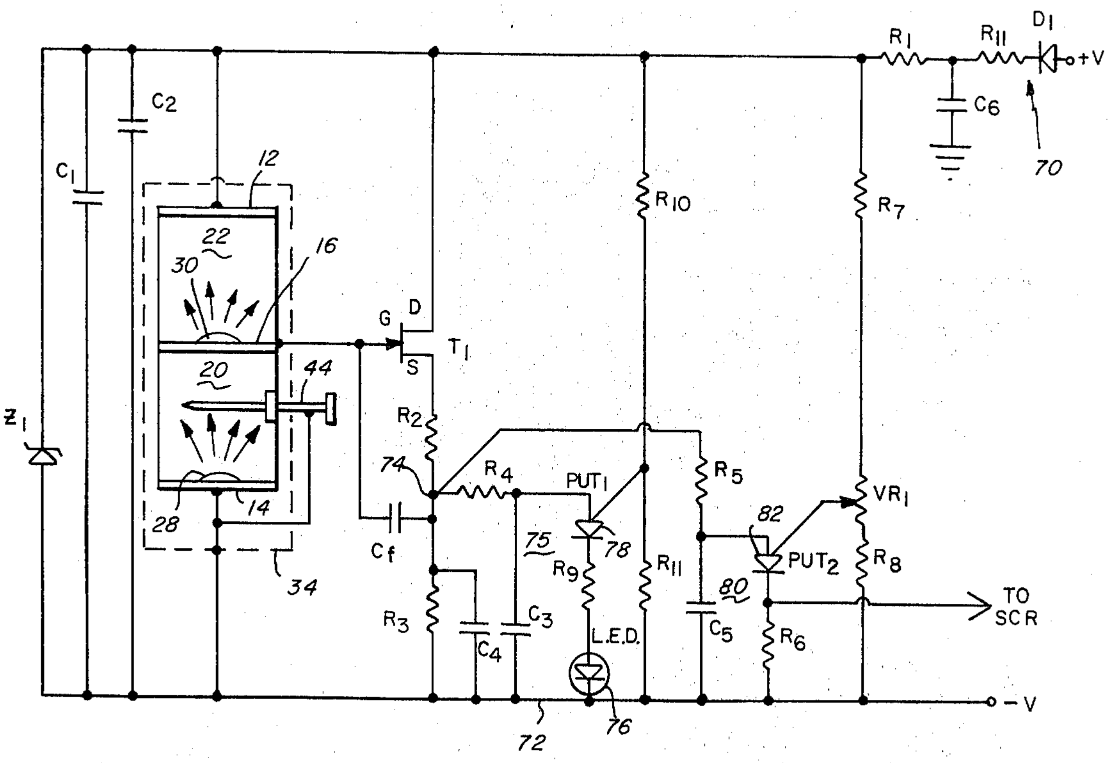
FIG. 6 is a circuit diagram associated with the detector of this invention.

FIG. 6 shows a preferred circuit for connection to the ionization chamber for generating an alarm condition upon detection of smoke. The detection chamber shown in FIG. 6 may be of the type disclosed and previously discussed with reference to FIG. 1. In this construction, there are provided the two chambers 20 and 22 each respectively housing beta sources 28 and 30. The plate 12 couples by way of protection circuit 70 to the positive voltage supply and plate 14 along with adjusting screw 44 couples to the negative voltage supply. The adjusting screw 44 is preferably adjusted so that the voltage at plate 16 is at the desired optimum level which is typically one half the positive supply voltage.

The protection circuit 70 comprises diode D1, resistors R1 and R11, and capacitor C6. This circuit provides line conducted r.f. interference protection. The basic voltage maintained across the detection chamber is established by the Zener diode Z1. This diode or a like voltage regulator may be used to insure a stable voltage supply for the ionization chamber and the associated circuitry. Capacitor C1 is preferably of a relatively low value such as 0.01 microfarad. These two parallel arranged capacitors provide transient and r.f. protection to the chambers and the associated circuitry.

Transistor T1 is a field effect transistor having its gate electrode coupled from the plate 16 of the detection chamber. The drain electrode of the transistor couples to the positive supply line and the source electrode of the transistor couples by way of resistors R2 and R3 to the minus voltage line 72. The transistor T1 is preferably contained within the shield as clearly indicated in FIG. 1. This transistor is a source follower which converts the extremely high impedance at its input gate electrode to a more manageable value at the source electrode of the transistor. The resistors R2 and R3 form the load for the field effect transistor. Capacitor Cf is a relatively low value bootstrap capacitor connected beween the node of resistors R2 and R3 and the gate electrode of the transistor. The purpose of this capacitor is to minimize the influence of r.f. radiation and transient signals that may occur at the node of resistors R2 and R3. The voltage at the node 74 is coupled to two separate but like circuits one of which is relaxation oscillator 75. This oscillator comprises resistors R4, R9, R10, and R11, capacitor C3, light emitting diode (LED) 76, and programmable unijunction transistor 78. The reference voltage for the oscillator 75 is established by resistors R10 and R11. The node between these resistors couples to the gate electrode of the transistor 78. The values of resistor R4 and capacitor C3 are chosen so that there is a relatively long pulse rate of, for example, one pulse every five seconds for illuminating LED 76. The purpose of the oscillator 75 is to supervise the condition of the ionization chamber. The resistors R10 and R11 are preselected so that the voltage at the node therebetween is lower than the source voltage of transistor T1 if the chamber is functioning properly. Under these conditions, the oscillator 75 is operating and the LED 76 produces a periodic light pulse to indicate the operative condition of the chamber. The resistors R10 and R11 may be adjusted so that the voltage at the node therebetween is, for example, + 5 volts. This voltage might correspond to a source voltage at transistor T1 of, for example, + 8 volts.

The node 74 also couples by way of resistor R5 to a similar type relaxation oscillator circuit 80. Circuit 80 comprises resistors R5, R6, R7 and R8, variable resistor VR1, capacitor C5 and programmable unijunction transistor 82. The reference voltage at the gate of transistor 82 is set by means of the variable resistor. This voltage is set at a higher voltage than the voltage at the gate of transistor 78. This voltage set by variable resistor VR1 is set above the quiescent (no alarm) voltage at the node 74 by an amount dependent upon the sensitivity required. Thus, the voltage at the node 74 must rise by a predetermined amount before there is an output from the cathode electrode of transistor 82. The output from the transistor 82 may be connected directly to an alarm system or via a gating circuit to provide isolation from other sensors. Alternatively, this output can be connected to a suitable device such as an SCR or relay.

The resistor R5 and capacitor C5 are chosen to give the proper delay which may be on the order of five seconds. This delay insures insensitivity to transient conditions that occur in the circuitry or that are induced extraneously.

Many existing circuits employ comparators for detection or voltage variations at the ionization chamber. However, in accordance with this invention, it has been found that the use of programmable unijunction transistors for supervising the voltage levels has distinct advantages over comparators. For one thing, these comparator circuits are generally more expansive and the circuitry is more complex especially if a time delay and trigger circuit are to be combined with the comparator. On the other hand, a programmable unijunction transistor circuit in accordance with this invention provides a delay, voltage sensing and an adjustable trigger level while also providing excellent noise immunity. Additionally, the capacitor of the circuit is fully discharged at the end of each cycle, thereby providing a known datum from which a charge cycle can be determined. This is especially useful whenever the output is connected to a pulse counting circuit for alarm purposes. Another major advantage to the circuit of this invention is that the stored charge in the capacitor C3 is used to illuminate the light emitting diode, thus removing the necessity of a relatively large intermittent load being applied to the power supply.

When the ionization chamber detects the presence of smoke, the impedance between the plates 14 and 16 increases, and thus the source voltage of transistor T1 also increases. This voltage increase is coupled by way of resistor R5 from node 74 and after a delay period determined by resistor R5 and capacitor C5 the transistor 82 conducts. When this occurs, an alarm condition is generated from a signal at the cathode of transistor 82.

With the chamber structure of this invention, atmospheric changes over a relatively long period of time are not detected, as the chamber structure provides for equalization of the environment in this condition. However, when a change in atmosphere occurs relatively rapidly, as when smoke is present, this smoke enters the chamber 20 relatively rapidly and causes an almost immediate detection.

Figure 7:
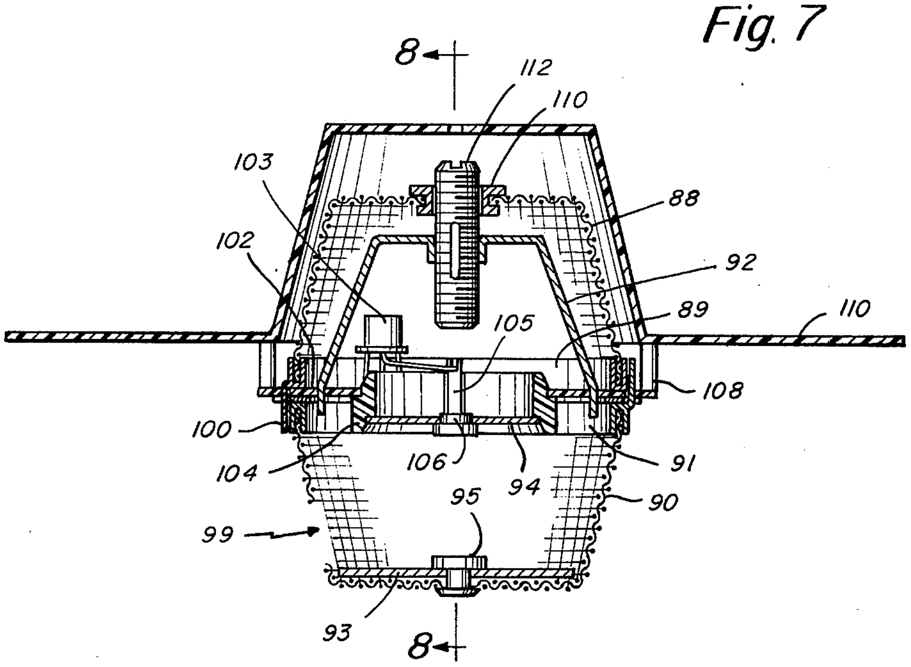
FIG. 7 is a cross-sectional view of still another embodiment of the present invention which is preferred form of the invention using a three chamber structure.
Figure 8:
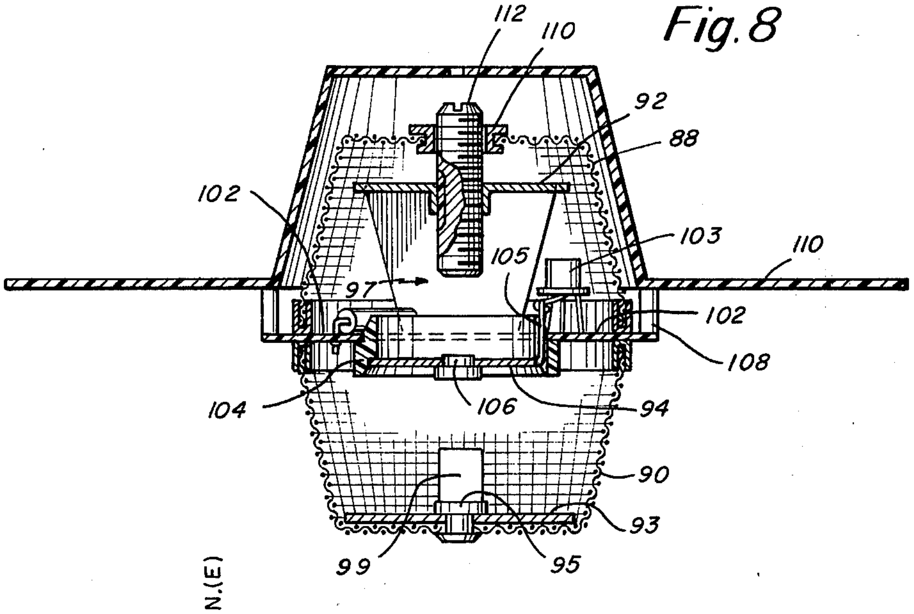
FIG. 8 is a cross-sectional view along line 8—8 of the detector shown in FIG. 7.

FIGS. 7–8 show a preferred form of the present invention, employing a three chamber structure, which has been found to provide the optimum working point for a detector while compensating for non-fire conditions. This arrangement preferably comprises the use of Beta sources which permit a closer inter-electrode spacing. This is because of the low energy and the attendant short range of these nickel 63 sources. With this embodiment in order to operate at the proper operating point, a third compensating chamber is used. This, in effect, "pads" the detection chamber with a high impedance that results from current flowing between the center electrode and the outer electrode/screen.

With regard to the embodiment shown in FIGS. 7 and 8, the current derived in the third chamber is a function of the current in the reference chamber, as ionization of both chambers is caused by the same source due to the relatively large opening between these chambers. Therefore, a feedback condition exists where the reduction in current in the detection chamber causes a decrease in voltage across the reference chamber and an increase in voltage across the third chamber. This increase in voltage will cause a greater proportion of ions generated by the reference chamber source to be captured by the third chamber electrode and results in the reducton of the effective impedance of the third chamber. This, in effect, stabilizes the operating point of the detector. Also, for slow ambient changes, current changes occur in all three chambers, thereby compensating for these slow ambient changes without the need for requiring a gas communication between chambers.

Figure 9:
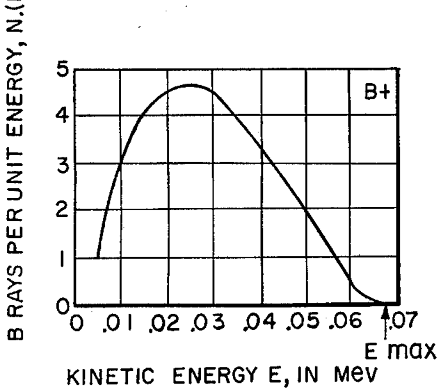
FIG. 9 is a curve showing the typical distribution for Beta radiation with the detector of this invention.

In accordance with the present invention, the spacing between the main electrodes is optimized. FIG. 9 shows for a particular source a distance at which maximum ionization occurs. By providing the main electrode spacing at or about this distance, optimum conditons exist for detection. When the electrodes are spaced too closely, if the gas density increases, the number of molecules within the path of the particular increases and the ionization current will increase, thus causing an imbalance. If the air density decreases, the reverse will occur, with an imbalance in the opposite direction. But, on the other hand, where the electrode spacing is too large, recombination effects are larger and will tend to increase with an increase in air pressure. By optimizing the spacing, ionization is complete for low values of air density, and, as the density increases, it will not result in an increase in the total ionization, thus resulting in a more stable operating point.

FIGS. 7 and 8 show a preferred form of the present invention which comprises a screen mesh cap 88, a second screen mesh cap 90, electrode 92, and common electrode 94. The screen mesh cap 88 has a circular base 89 for holding this screen mesh in a supported position. Similarly, the screen mesh 90 has a circular base 91 for supporting the mesh cap 90. One of the main electrodes 93 is shown in the form of a plate supported at the bottom of the cap 90 in the position shown in FIG. 7. The plate 93 accomodates one of the radioactive Beta sources 95. Access to the radioactive source may be provided by means of an opening 99 in the mesh cap 90. This enables cleaning or replacement of the radioactive source.

Both of the caps 88 and 90 have a plurality of tabs 100 which secure both of the caps to a printed circuit board 102. The tabs 100 may connect to runs on the printed circuit board, and, in addition to securing the caps to the printed circuit board, function as connections for electrically tying the two caps together so that they are maintained at the same potential.

One of the other main electrodes 92 is also secured to the printed circuit board 102 and has bottom legs extending thereto as shown in FIG. 7. The electrode 92 is of cap shape but has an opening 97 which is preferred in accordance with the teachings of this invention.

FIGS. 7 and 8 show components such as transistor 103 connected also to the printed circuit board 102. A support 104 which is constructed out of insulating material holds the common electrode 94. FIG. 8 shows one terminal of the transistor 103 connecting by means of lead 105 to the main common electrode 94. A second radioactive source 106 is supported from the electrode plate 94. The device, including the caps 88 and 90 and the printed circuit board 102, is supported by suitable means such as studs 108 from a support structure 110 which may be constructed of an insulating plastic material.

The top end of mesh cap 88 has an inwardly threaded bushing 110 for supporting the adjusting electrode 112. In this embodiment, the electrode 112 is constructed of a dielectric insulating material. The electrode 92 also includes an aperture opening that may be threaded for receiving and guiding the adjustable electrode 112. The electrode 112 operates analogously to the electrode 44, for example, as shown in FIG. 1. But even though the electrode in this embodiment is constructed out of insulating material, it also functions as a means for capturing electrodes and varying the ionization current through the chamber.

With the embodiments shown in FIGS. 7 and 8, a circuit like the one shown in FIG. 6 may be used. In this case, the electrode 92 may be connected to a positive voltage supply; the electrode 93 to a ground or a negative voltage supply, and the signals are coupled to transistor 103 from the common electrode 94.

As previously mentioned, it is preferred that both of the caps 88 and 90 be connected together, and connected also to the same potential, which may, for example, be ground voltage or a negative voltage. It is also preferred that the electrode 92 be open to permit some ionization current to flow to the outer electrode represented by the mesh cap 88. This structure thus modifies the current which flows from the electrode 94 to the electrode 92 with the outer mesh electrode 88 capturing some of the ionization current. This arrangement functions as a high resistance shunt between electrode plate 94 and 93, it being recalled that electrode 93 and mesh caps 88 and 90 are all at the same potential. When smoke enters the area between electrodes 93 and 94, the current is reduced, but, as smoke cannot enter the upper two chambers, there is a modifying effect which allows the detection chamber to operate at a desired part of its characteristic with regenerative stabilization.

The distribution of ions within the chamber structure tends to be cone-shaped, especially when the source is an Alpha radioactive source. Thus, it has been realized in accordance with the present invention that the electrodes can provide increase collection of ions by restructuring the shape of the electrodes. More particularly, it is desirable to decrease the path length and thus the electrodes such as electrode 92 extend downwardly as shown in FIG. 7 toward the common electrode 94. Also, the caps 88 and 90 terminate near the printed circuit board, also creating smaller path lengths for the particles between these electrodes and the common electrode 94.

What is claimed is:

1. An ionization detector comprising;

a chamber structure including means defining a first chamber, means defining a second chamber having means for receiving gases from external of the second chamber, and common boundary means between chambers including a common electrode, one electrode associated with said second chamber, another electrode within the first chamber defining a third chamber within the first chamber and being at least partially open to provide an ionization path between the first and third chambers, means including a radioactive source disposed in at least the second chamber for establishing an ionization current in the chamber structure, and means coupled from at least the common electrode for detecting changes in the ionization current.

2. An ionization detector as set forth in claim 1 wherein said means defining a first chamber and said means defining a second chamber each comprise a cap means that join at open ends to define the outer boundaries of the chamber structure.

3. An ionization detector as set forth in claim 2 including means for conductively intercoupling the cap means and means for maintaining the both cap means at the same potential.

4. An ionization detector as set forth in claim 3 wherein said cap means each include a mesh cap.

5. An ionization detector as set forth in claim 2 wherein said common boundary means comprises a circuit board having means for receiving said cap means.

6. An ionization detector as set forth in claim 5 wherein said another electrode comprises an open frame having legs received by the circuit board.

7. An ionization detector as set forth in claim 1 including an adjustable particle capturing member extending at least partially into the chamber structure for adjusting the ionization current.

8. An ionization detector as set forth in claim 7 including support means for the adjustable member for supporting the member for movement into the third chamber.

9. An ionization detector as set forth in claim 8 wherein said another electrode has an aperture for receiving an elongated adjustable member.

10. An ionization detector as set forth in claim 9 wherein the means for supporting the adjustable member includes an insulating means.

11. An ionization detector as set forth in claim 2 wherein said cap means form a hexagonally shaped chamber structure.

12. An ionization detector comprising;

means defining a chamber having port means for receiving gases from outside of the chamber, fixed position electrodes associated with and at least in part defining the chamber and spaced from one another, means including a radioactive source disposed in the chamber for establishing an ionization current in the chamber between the electrodes, an adjustable particle capturing member contained in the chamber between the fixed electrodes and movable to alter the ionization current, means for supporting the particle capturing member with said member having an end extending through one of said electrodes into the chamber, the area of said end within the chamber being variable to vary the number of particles captured thereby finely adjusting the ionization current, and means coupled from the electrodes for detecting changes in the ionization current.

13. An ionization detector as set forth in claim 12 including at least two chambers having a common electrode therebetween, said particle capturing electrode extending toward said common electrode.

14. An ionization detector as set forth in claim 13 wherein one of said electrodes is disposed within one of the two chambers to thereby define a third chamber therein.

15. An ionization detector as set forth in claim 14 wherein said one electrode defining the third chamber is at least partially open.

16. An ionization detector as set forth in claim 15 wherein said one electrode is cap-shaped having an opening for receiving the particle capturing member.

17. An ionization detector comprising; a chamber structure including at least two chambers one of which is a detection chamber for receiving gases or particles, common boundary means between chambers including a common electrode, said one chamber having an electrode extending between ends of the one chamber in part defining the one chamber, and terminating at the common boundary means, said other chamber having an electrode extending between ends of the other chamber in part defining the other chamber and also terminating at the common boundary means, the electrodes of both chambers being spaced from said common electrode, and means including a radioactive source disposed in the chamber structure for establishing an ionization current in the chamber structure.

18. An ionization detector as set forth in claim 17 wherein said electrodes of said chambers are each cap-shaped and together define the major portion of the chamber structure.

19. An ionization detector as set forth in claim 18 including an additional electrode in said other chamber and being at least partially open to provide an ionization path to the cap-shaped electrode.

20. An ionization detector as set forth in claim 19 including an adjustable particle capturing member extending at least partially into the chamber structure for adjusting the ionization current.

21. An ionization detector as set forth in claim 20 wherein said adjustable particle capturing member extends through at least said additional electrode in a direction toward the common electrode.

22. An ionization detector as set forth in claim 18 wherein both cap-shaped electrodes are of a wire mesh construction.

23. An ionizaton detector comprising; a chamber structure including means defining a first chamber, means defining a second chamber, having means for receiving gases from external of the second chamber, and common boundary means between chambers including a common electrode, one electrode associated with said second chamber, another electrode within the first chamber defining a third chamber within the first chamber and being at least partially open to provide an ionization path between the first and third chambers, and means including a radioactive source disposed in the chamber structure for establishing an ionization current therein.

* * * * *